United States Patent
Lee et al.

(10) Patent No.: US 6,294,287 B1
(45) Date of Patent: Sep. 25, 2001

(54) ALKALINE CELL WITH INSULATOR

(75) Inventors: Tae-Won Lee, Framingham; James M. Cichon, Norwood; Stuart M. Davis, Norfolk, all of MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/377,005

(22) Filed: Aug. 18, 1999

(51) Int. Cl.[7] ............................ H01M 10/50; H01M 2/02
(52) U.S. Cl. ............................ 429/120; 629/163; 629/167
(58) Field of Search ........................ 429/120, 163, 429/169, 167, 175, 176

(56) References Cited

U.S. PATENT DOCUMENTS

| | | | |
|---|---|---|---|
| 4,608,323 | 8/1986 | Zaborney | 429/167 |
| 4,627,154 * | 12/1986 | Pattison | 29/623.1 |
| 4,840,855 * | 6/1989 | Foti et al. | 429/120 |
| 5,443,668 | 8/1995 | Zaborney | 156/86 |
| 5,612,151 | 3/1997 | Hughen | 429/93 |

* cited by examiner

Primary Examiner—Stephen Kalafut
Assistant Examiner—Julian A. Mercado
(74) Attorney, Agent, or Firm—Barry D. Josephs; Paul I. Douglas; Thomas G. Krivulka

(57) ABSTRACT

The performance of alkaline cells comprising a zinc anode and manganese dioxide cathode can be improved, especially in high power application, by applying thermal insulating material to the cell casing. The thermal insulation material can be conveniently applied between the cell label and casing. The thermal insulating material significantly reduces the overall heat transfer coefficient, $U_o$, for the cell. The insulation increases the internal temperature of the cell during discharge, resulting in better performance.

18 Claims, 2 Drawing Sheets

ALKALINE CELL WITH INSULATOR

FIELD OF THE INVENTION

The invention relates to alkaline cells having a cathode comprising manganese dioxide. The invention relates particularly to an alkaline cell having an anode comprising zinc, a cathode comprising manganese dioxide, and an electrolyte comprising potassium hydroxide wherein the cell has an insulator to improve performance.

BACKGROUND

The cell contents of a primary alkaline cell typically contain an anode comprising zinc anode active material, alkaline electrolyte, a cathode comprising manganese dioxide cathode active material, and an electrolyte ion permeable separator, typically comprising a nonwoven material containing cellulosic fibers and polyvinylalcohol fibers. The anode active material comprises zinc particles admixed with zinc oxide and conventional gelling agents, such as carboxymethylcellulose or acrylic acid copolymers, and electrolyte. The gelling agent holds the zinc particles in place and in contact with each other. A conductive metal nail, known as the anode current collector, is typically inserted into the anode material in contact with the end cap which forms the cell's negative terminal. The alkaline electrolyte is typically an aqueous solution of potassium hydroxide, but other alkali solutions of sodium or lithium hydroxide may also be employed. The cathode material is typically of manganese dioxide and may include small amounts of carbon or graphite to increase conductivity. Conventional alkaline cells have solid cathodes comprising battery grade particulate manganese dioxide. Battery grade manganese dioxide as used herein refers to manganese dioxide generally having a purity of at least about 91 percent by weight. Electrolytic $MnO_2$ (EMD) is the preferred form of manganese dioxide for alkaline cells because of its high density and since it is conveniently obtained at high purity by electrolytic methods. EMD is typically manufactured from direct electrolysis of a bath of manganese sulfate and sulfuric acid.

The cathodes of conventional $Zn/MnO_2$ alkaline cells the manganese dioxide composition is typically between about 70 and 87 percent by weight. Particulate graphite and aqueous KOH solution (7–11 Normal) can be added to the manganese dioxide to form a cathode mixture. Such mixtures form a moist solid mix which can be fully compacted into the cell casing using plungers or other such compacting devices forming a compacted solid cathode mass in contact with the cell casing. The cathode material can be preformed into the shape of disks forming annular rings inserted into the cell in stacked arrangement and then recompacted.

Since commercial cell sizes are fixed, it has been desirable to attempt to increase the capacity, i.e., the useful service life of the cell, by increasing the surface area of the electrode active material and by packing greater amounts of the active material into the cell. This approach has practical limitations.

If the active material is packed too densely into the cell, this can reduce the rate of electrochemical reaction during discharge, in turn reducing service life. Other deleterious effects such as polarization can occur, particularly at high current drain (high power applications). Polarization limits the mobility of ions within the electrode active material and within the electrolyte, which in turn reduces service life. The contact resistance between the $MnO_2$ cathode active material and the cell casing of an alkaline cell also reduces service life. Such contact resistance losses typically increases, particularly as the cell is discharged during high power applications (between about 0.5 and 1 watt).

There are increasing commercial demands to make primary alkaline cells better suitable for high power application. Modern electronic devices such as cellular phones, digital cameras and toys, flash units, remote control toys, camcorders and high intensity lamps are examples of such high power applications. Such devices require high current drain rates, typically pulsed drain, of between about 0.5 and 2 Amp, more usually between about 0.5 and 1.5 Amp. Correspondingly, they require operation at power demands between about 0.5 and 2 watt. Modern electronic devices such as cellular phones, digital cameras and toys, flash units, remote control toys, camcorders and high intensity lamps are examples of such high power applications. Thus, it is desirable to provide a way of reliably increasing the useful service life of conventional primary alkaline cells particularly for cells to be used in high power applications, without significantly increasing polarization effects or otherwise adversely affecting cell performance.

The steel casing of the alkaline cell is conventionally covered with a label containing graphics and printed information about the cell and manufacturer. It has been the practice in the battery art to make the labels as thin as possible thereby providing the cell with maximum volume for electrochemically active material. Conventional cell labels are heat shrinkable, though flexible and typically formed of polyvinylchloride (PVC) or polypropylene film. However polyethylene terephthalate film (PET) or glycolmodified polyethylene terephthalate film (PETG) are also desirable. The Label is typically single or double ply, preferably single ply. The label conventionally has a thickness of less than 10 mil (250 micron), typically less than 5 mil (125 micron). The label typically has a thickness between 3 mil (75 micron) and 10 mil (250 micron), more typically between about 3 and 5 mil (75 and 125 micron). Such label is disclosed, e.g., in U.S. Pat. Nos. 4,608,323 and 5,443,668. For example, in U.S. Pat. No. 4,608,323 it is stated that the maximum thickness of a preferred jacket (2 ply label) is about 80 to 85 micron overall. It is stated that this includes about 40 micron for the outer layer, 30 micron for the inner layer and about 10–15 microns for the ink and clear adhesive therebetween). At such thickness the label provides negligible thermal insulation.

Condition indicators (on-cell testers) for the cell can be integrated under a portion of the label, for example, as illustrated in U.S. Pat. No. 5,612,151. Since such indicators are thin and applied over only a very small portion of the casing, they have negligible insulating effect on the cell.

SUMMARY OF THE INVENTION

Figure 1:
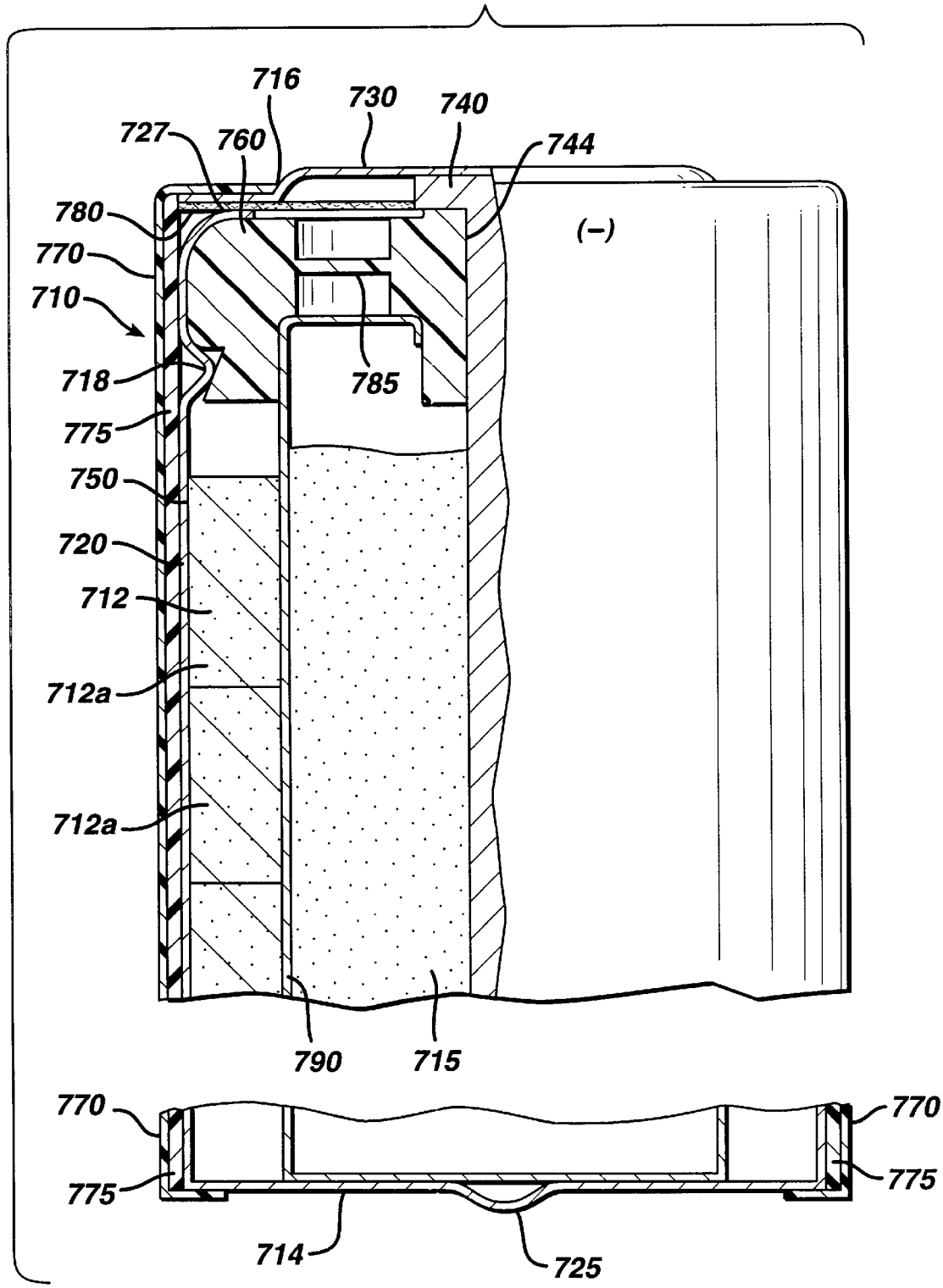
FIG. 1 is a cross-sectional cut away view of an alkaline cell having an insulator on the outside of the casing.

Applicant has determined that the suitability of modern alkaline cells for high power application is markedly improved when thermal insulation is provided around the cell casing (housing). The performance is improved with the thermal insulation even if the electrolyte loading (zinc bulk density) in the anode is varied or the composition of anode or cathode active material is varied. However, present invention employing thermal insulation is particularly applicable to zinc/$MnO_2$ alkaline cells where the bulk density of the zinc in the anode is desirably between about 1.5 and 3.0 g/cm$^3$, preferably between about 1.75 and 2.5 g/cm$^3$. The percent by volume of the aqueous electrolyte solution in the anode is between about 58 and 80 percent, preferably between about 65.0 and 75.5 percent by volume of the anode.

It is not known with certainty why the alkaline cell's performance so markedly improves under high power application when the cell is provided with thermal insulation. As a cell is discharged, particularly under high power application, e.g. at power demands between about 0.5 and 2.0 Watt (0.5 and 2 Amp drain), it generates heat. The insulation causes the cell to operate at higher temperatures. It is theorized that ionic mobility and transport is greatly improved when the cell is insulated. This reduces the degree of polarization occurring in the cell and leads to much better utilization of active material and better performance. Polarization is the potential drop during discharge and the increase in resistance associated with this drop is often referred to as "polarization resistance". Polarization may be broken down into ohmic polarization, kinetic polarization and concentration polarization.

Ohmic polarization is mainly due to the electrolyte conductivity through the separators and through the electrodes. Since the electrolyte conductivity improves with temperature, the ohmic resistance decreases when the cell internal temperature is higher. Kinetic polarization reflects energy loss which could otherwise be used in the chemical reaction. At high cell temperature, kinetic polarization becomes lower. Concentration polarization stems from the concentration gradient of reactants (water, hydroxyl ions and protons) and products (zincate ions). At high cell temperature, the transport properties (mobility and diffusivity) of these materials are enhanced, thus, resulting in a reduction in concentration polarization.

In one aspect suitable thermal insulation can be provided in the form of insulating layer which is adhesive coated on its inside surface. The insulation can be wrapped around the cell casing so that it adheres to the cell casing and the cell label then applied onto the outside surface of the insulation. Alternatively, the cell label can be preapplied to the outside surface of the insulation layer or otherwise the cell label can be integrated into the insulation. The thermal insulation can be in the form of an insulating film applied to the cell casing by other methods, for example, by cast or dip coating, or by extrusion.

Alternatively, the insulation can be applied by the electronic device manufacturer (OEM) to line the battery compartment. The insulation can thus be applied to line either the outside surface or inside surface (or both inside and outside surface) of the battery compartment. The insulation can be one or a multiple of layers including thermally insulating plastic or foam materials and other insulation materials with or without air gaps therebetween. The battery compartment wall itself can be made of insulating material or can be made thick enough to have insulating value. The insulation can thus be any thermally insulating material or thermally insulating composite materials between the cell casing (housing) and the ambient environment. The term thermally insulating materials is intended to be construed broadly to include essentially any material or composite material desirably having thermally insulating value less than about 10 BTU/[(hr) (ft) (° F.)] which is equivalent to less than about $4.14 \times 10^{-2}$ cal/[(sec) (cm) (° K.)]. Preferably, the insulation material has a conductivity of less than about 1.0 BTU/[(hr) (ft) (° F.)] which is equivalent to less than about $4.14 \times 10^{-3}$ cal/[(sec) (cm) (° K.)].)

Alternatively, the insulation can be in the form of an insulation sleeve which can be slipped over the cell casing by the user before the cell is inserted into the battery compartment. The insulating sleeve can be permanently adhered to the cell casing or can be a fitted sleeve which is manually removable therefrom. The insulating sleeve desirably has a thickness between about 1 and 12 mm.

The thermal insulation material reduces the overall heat transfer coefficient, $U_o$, for the cell by at least 65% compared to the same cell without said insulation ($U_o$ is based on the inside surface of the casing and is the overall heat transfer coefficient between the inside surface of the casing and ambient air on the outside of the cell). The insulation thus, significantly increases the internal temperature of the cell as the cell is discharged.

The thermal insulation advantageously has a thickness between about 250 micron (10 mil or 0.25 mm) and 15 mm (and greater), preferably between about 500 micron (20 mil or 0.50 mm) and 15 mm (and greater). The thermal insulation desirably has a thickness between about 1000 micron (1 mm) and 15 mm, preferably between about 2000 micron (2 mm) and 15 mm, more preferably between about 2000 micron (2 mm) and 12 mm. Advantageously, the thermal insulation has a thickness between about 3000 micron (3 mm) and 15 mm, preferably between about 3000 micron (3 mm) and 12 mm. If insulation is added to the outside surface of a C cell to give the cell an outside diameter of a D cell, the insulation thickness is 3.84 mm (0.384 cm). If insulation is added to the outside surface of an AA cell to give the cell an outside diameter of a D cell, the insulation thickness is 9.47 mm (0.947 cm). If insulation is added to the outside surface of an AAA cell to give the cell an outside diameter of a D cell, the insulation thickness is 11.37 mm (1.14 cm). If insulation is added to the outside surface of an AAAA cell to give the cell an outside diameter of a D cell, the insulation thickness is 12.6 mm (1.26 cm).

The insulation can be selected from a wide range of materials, particular material from the classes of plastics, rubber, or ceramics. Particularly desirable materials within these classes are cork, brick, celluloid, mylar foil, preferably nylon or polystyrene or polyurethane foam material. Materials such as nylon, polystyrene or polyurethane foam are preferred since they are relatively inexpensive, have low thermal conductivity and are readily applied by conventional adhesive methods.

It has been determined that $Zn/MnO_2$ alkaline cells with thermal insulation perform better, particularly under high power application, for example, current drain between about 0.5 and 2 Amp, more typically between about 0.5 and 1.5 Amp or conversely at power demands between about 0.5 and 2 Watt. The alkaline cells with thermal insulation exhibit better performance, for example, longer service life and greater total energy output than the same cell without the insulation, irrespective of cell size. It is recognized that large conventional alkaline cells, for example, D size cells exhibit less actual specific capacity (mAmp-hr/g) (lower utilization of active material) during high rate or high power discharge than smaller size cells, for example AA cells.

In one aspect of the invention a C cell is wrapped in thermal insulation so that it overall diameter becomes that of a D cell diameter. Under high power application, e.g. current drain between about 1 and 2 Amp continuous drain to a cut off voltage of 0.8 Volts, or intermittent drain of, for example, 1 Amp for 1 hour per day, the thermal insulation improves utilization of active material in the C cell to a degree that the C cell with insulation exhibits service life comparable to that of a D cell without insulation.

The zinc/Mno$_2$ alkaline cell of the invention is essentially mercury free, that is, does not contain any added mercury.

Therefore, the cell of the invention has a total mercury content less than about 50 parts per million parts of total cell weight, preferably less than 20 parts per million of total cell weight, more preferably less than about 10 parts per million of total cell weight. The cell of the invention also preferably does not contain added amounts of lead and thus is essentially lead free, that is, the total lead content is less than 30 ppm, desirably less than 15 ppm of the total metal content of the anode. Despite the fact that the cell is essentially free of mercury and lead, the cell operation at higher temperature resulting form the use of thermal insulation does not increase gassing to a level that interferes with the cell's overall performance when the cell is discharged at high rate (0.5 to 2 Amp). Rather, the use of thermal insulation around the casing of a zinc/MnO2 alkaline cell enhances performance under high rate discharge.

DETAILED DESCRIPTION

When an alkaline cell is discharged, the cell temperature increases due to the generated heat from the discharge. The source of heat results from exothermic electrochemical reaction within the cell. The amount of heat generated can be quite high. It has been determined that cell performance improves markedly when the cell operates at elevated temperature. Normally, most of the heat is dissipated to the environment during discharge. It has been determined that performance of the cell can be markedly improved if insulation is provided to the outside of the cell's casing, thereby reducing the overall heat transfer coefficient for the cell and causing the cell to operate at higher temperatures. Alternatively, the insulation can be applied by the electronic device manufacturer (OEM) to line the battery compartment. The insulation can thus be applied to line either the outside surface or inside surface (or both inside and outside surface) of the battery compartment. The battery compartment wall itself can be made of insulating material or can be made thick enough to have insulating value. If insulation is used to line a surface of the battery compartment desirably it has a thickness between about 1 mm and 12 mm. Alternatively, the insulation can be in the form of an insulation sleeve which can be slipped over the cell casing by the user before the cell is inserted into the battery compartment. The insulating sleeve can be permanently adhered to the cell casing or can be a fitted sleeve which is manually removable therefrom. The insulating sleeve desirably has a thickness between about 1 mm and 12 mm. The insulating sleeve can be selected from a variety of conventional materials having insulating value. Such materials can include material of woven, or unwoven fibers, plastics such as polystyrene, polyolefin polycarbonate, or nylon, cellulosic material such as cork or celluloid, foam material such as polystyrene foam, ceramics and elastomeric materials and polyurethane.

The performance improvement data shown in the ensuing Examples and Tables are for cells to which insulation has been preapplied to the cell casing. It should be appreciated that about the same performance improvement results can be expected if the same insulation material at same thickness was applied to line the battery compartment or if it was applied by the user as an insulation sleeve over the cell casing before the cell is inserted into the battery compartment.

The insulation can be of plastic or foam materials and other conventional insulation materials. The insulation can be coated or extruded onto the cell casing or may be applied in the form of a wound tape. The insulation can be composed of one or a multiple of layers of the same or different materials with or without air gaps therebetween. The insulation around the cell casing can have discontinuites, breaks or gaps in its surface. The insulation can thus be any thermally insulating material or thermally insulating composite materials between the cell casing (housing) and the ambient environment. The term thermally insulating materials is intended to be construed broadly to include essentially any material having thermally insulating value, preferably materials having a thermal conductivity less than about 10 BTU/[(hr) (ft) (° F.)] which is equivalent to less than about $4.14 \times 10^{-2}$ cal/[(sec) (cm) (° K.)]. Preferably the insulation material has a conductivity of less than about 1.0 BTU/[(hr) (ft) (° F.)] which is equivalent to less than about $4.14 \times 10^{-3}$ cal/[(sec) (cm) (° K.)].)

A representative primary zinc/manganese dioxide alkaline AA cell 710 can be prepared with particulate manganese dioxide. The AA cell is prepared with a cell casing (housing) 720 formed of steel which is plated on the inside and outside surface with nickel. The inside surface of the casing can be coated with a conductive material for example, with carbon. The casing used in the examples herein had a carbon coating. Conventional cathode and anode mixtures, electrolyte and separator membrane are employed. A thermally insulating layer 775 of the invention can be applied over casing 720. The insulation layer 775 preferably covers a major portion of the cell casing, for example, more than 50%, preferably more than 75% of the casing surface, and more preferably it covers the entire casing (longitudinal) surface. The insulating layer 775 can be composed of single or multiple layers and can have a convoluted surface, or a surface with discontinuities or openings therein.

The thermal insulation 775 desirably has a thermal conductivity at room temperature between about 0.01 and 10 BTU/[(hr) (ft) (° F.)] which is equivalent to between about $4.14 \times 10^{-5}$ and $4.14 \times 10^{-2}$ cal/[(sec) (cm) (° K.)], preferably between about 0.01 and 1.0 BTU/[(hr) (ft) (° F.)] for plastics at room temperature which is equivalent to $4.14 \times 10^{-5}$ and $4.14 \times 10^{-3}$ cal/[(sec) (cm) (° K.)].

The thermal insulation 775 desirably has a thickness between about 250 micron (10 mil or 0.25 mm) and 15 mm (and greater), preferably between about 500 micron (20 mil or 0.5 mm) and 15 mm (and greater). The thermal insulation desirably has a thickness between about 1000 micron (1 mm ) and 15 mm, preferably between about 2000 micron (2 mm) and 15 mm, more preferably between about 2000 micron (2 mm) and 12 mm. Advantageously the thermal insulation has a thickness between about 3000 micron (3 mm) and 15 mm, preferably between about 3000 micron (3 mm) and 12 mm. If insulation is added to the outside surface of a C cell to give the cell an outside diameter of a D cell, the insulation thickness is 3.84 mm (0.384 cm). If insulation is added to the outside surface of an AA cell to give the cell an outside diameter of a D cell, the insulation thickness is 9.47 mm (0.947 cm). If insulation is added to the outside surface of an AAA cell to give the cell an outside diameter of a D cell, the insulation thickness is 11.37 mm 1.14 cm). If insulation is added to the outside surface of an AAAA cell to give the cell an outside diameter of a D cell, the insulation thickness is 12.6 mm (1.26 cm).

The insulation can be selected from a wide range of materials, particular material from the classes of plastics, rubber, or ceramics. The insulation is desirably formed a single or multiple ply plastic film which has sufficient flexibility that it can be wrapped around the casing. Particularly desirable materials within these classes are cork, brick, celluloid, mylar foil, preferably nylon or polystyrene or polyurethane foam material. Materials such as nylon, polystyrene or polyurethane foam are preferred since they are relatively inexpensive, have low thermal conductivity (between about 0.01 and 1.0 BTU/[(hr) (ft) (° F.)] equivalent to $4.14 \times 10^{-5}$ and $4.14 \times 10^{-3}$ cal/[(sec) (cm) (° K.)] and are readily applied to the cell casing, for example, by adhesion.

Thermal insulation 775 can be in the form of insulating layer which is adhesive coated on its inside surface. The insulation can be wrapped around the cell casing so that it adheres to the cell casing, preferably the entire outside surface of the casing as illustrated in FIG. 1. The thermal insulation can be in the form of an insulating film applied to the cell casing by other methods, for example, by cast or dip coating, or by extrusion.

A conventional cell label 770 can then be applied onto the outside surface of the insulation layer 775. The cell label 770 can have an adhesive coating on its inside surface and the label can then be wrapped around the insulating layer. Alternatively the label can be formed of a thermoplastic material such polyvinylchloride or polypropylene and heat shrunk over the insulating layer. Alternatively, the cell label can be preapplied to the outside surface of the insulation layer before the insulation 775 is applied to the cell casing. Conventional cell labels 770 are heat shrinkable, though flexible and formed of polyvinylchloride PVC) film. However polyethylene terephthalate film (PET) or glycolmodified polyethylene terephthalate film (PETG) or polypropylene are also desirable. Label 770 is typically single or double ply, preferably single ply. Cell label 775 conventionally has a thickness of less than 10 mil (250 micron), typically less than 5 mil (125 micron), preferably between about 3 and 5 mil (75 and 125 micron). Such label is disclosed, for example, in U.S. Pat. Nos. 4,608,323 and 5,443,668. At such thickness the label provides negligible thermal insulation.

It should be recognized that label 770 can be integrated into the insulation material 775 or that the insulation material can be used instead of the label. In the latter case printed material can be applied directly to the insulation material 775 and the term label as used in the claims shall be construed to mean the printed material contained on the insulation material.

The anode material can be in the form of a gelled mixture containing mercury free (zero-added mercury) zinc alloy powder. Such mixture may typically contain aqueous KOH electrolyte solution, gelling agent, e.g. acrylic acid copolymer such as CARBOPOL C940 from B.F. Goodrich; and surfactants e.g. organic phosphate ester surfactant GAFAC RA600 from Rhone Poulenc. Such mixture is given as illustrative and not intended to restrict the invention. Other representative gelling agents for zinc anodes are disclosed in U.S. Pat. No. 4,563,404. Other organic additives which can be added to zinc slurries are disclosed in European Patent Publication 0474382A1. The separator membrane can be a conventional ion permeable membrane of nonwoven material comprising polyvinylalcohol and cellulosic (rayon) fibrous material. The electrolyte is an aqueous solution of KOH containing about 7–11 Normal KOH and 2 wt % ZnO, hereinafter referred to as "aqueous KOH solution".

The cathode in the cell desirably has the following composition:

Electrolytic manganese dioxide (80–87 wt %), graphite (7–10 wt %), and a 7–10 Normal ("aqueous KOH solution between about 30–40 wt. KOH concentration") (5–7 wt %); polyethylene or polyacrylomide binder (0.1 to 0.5 wt %). Such cathode mixtures are intended to be illustrative and non intended to restrict the invention.

The anode material desirably has the following composition:

Zinc alloy powder 62 to 69 wt % (99.9 wt % zinc containing indium), aqueous KOH solution comprising (38 wt % KOH and about 2 wt % ZnO); CARBOPOL C940 (B.F. Goodrich) cross linked acrylic acid polymer gelling agent (between 0.3 and 2 wt %) and Waterlock A-221 (Grain Processing Co.) hydrolyzed polyacrylonitrile grafted unto starch backbone (between 0.01 and 0.5 wt. %; RM-510 (Rhone-Pulenc) dionyl phenol phosphate ester surfactant (50 ppm). The zinc alloy average particle size is desirably between about 30 and 350 micron. The bulk density of the zinc in the anode (anode porosity) is between about 1.75 and 2.5 grams zinc per cubic centimeter of anode. The percent by volume of the aqueous electrolyte solution in the anode is between about 65.0 and 75.5 percent by volume of the anode.

The separator in each case was a conventional ion porous separator comprising an inner layer of nonwoven material of cellulosic (rayon) and polyvinylalcohol fibers and outer layer of cellophane. Such material is illustrative and not intended to restrict the invention. The cells tested were balanced in conventional manner so that the mamp-hr capacity of $MnO_2$ (based on 370 mAmp-hr per gram $MnO_2$) divided by the mAmp-hr capacity of zinc alloy (based on 822 mAmp-hr per gram zinc alloy) is about 1.

A representative alkaline cell configuration is shown in FIG. 1. The alkaline cell 710 comprises a cylindrical steel casing 720, having a closed end 714 and an open end 716. The cell is filled with cathode 712 comprising $MnO_2$, and an anode 715 comprising zinc and electrolyte. The electrolyte in the anode comprises a conventional mixture of KOH, ZnO and gelling agent. The cathode 712 can be supplied in the form of a series of gcompacted annular blocks 712a. The cathode blocks 712a are inserted into the cell so that their outside surface contacts the inside surface 750 of casing 720 as shown in FIG. 1. The anode and cathode can be separated by a conventional ion porous separator 790, for example, comprising polyvinylalcohol and cellulosic fibrous material. After cell 610 is filled an insulating plug 760 is inserted into open end 616. Insulating plug 760 may be of polypropylene, talc filled polypropylene, sulfonated polyethylene or nylon. The plug 760 is preferably snap fitted around circumferential step 718 as shown in FIG. 1 so that the plug locks in place into the open end 716. Plug 760 can have an integral coin shaped thinned out portion 785 which is designed to rupture allowing gas to escape therethrough if the gas pressure within the cell builds up to exceed a predetermined level. The peripheral edge 727 of casing 720 is crimped over the top of insulating plug 760. A paper insulating washer 780 is applied over the crimped peripheral edge 727 of casing 720. Insulating washer 780 can be a polyethylene coated paper washer. A terminal end cap 730 is welded to the head of current collector 740. An elongated current collector 740 is then inserted (force fitted) into aperture 744 of insulating plug 760 so that end cap 630 comes to rest against insulating washer 780. Current collector 740 can be selected from a variety of known electrically conductive metals found to be useful as current collector materials, for example, brass, tin plated brass, bronze, copper or indium plated brass. The current collector 740 used in the test cells was of brass. Conventional asphalt sealant may be preapplied around the current collector 740 before it is inserted into aperture 744. A thermally insulating layer 775 of the invention is wrapped, extruded, heat shrunk or otherwise inserted over casing 720. Insulating layer 720 can be provided with an adhesive on its inside surface so that it adheres to casing 720. A film label 770 containing printed information can be applied around insulating layer 775. The terminal end cap 730 becomes the negative terminal of alkaline cell 710 and pip 725 at the closed end of casing 720 becomes the positive terminal.

The cell 710 shown in FIG. 1 can be an AA cell. However, the alkaline cell shown in FIG. 1 is not intended to be restricted to any particular size. Thus, the present invention is applicable to AAAA, AAA, AA, C and D size cylindrical alkaline cells as well as button size alkaline cells of any size or shape. Alkaline cell 710 is not intended to be restricted to any particular cell chemistry or cell size, except that a thermally insulating layer 775 is applied around the cell casing 720. Thus, cell 710 can contain conventional alkaline cell chemistries including those which contain zero added mercury (less than 50 parts mercury per million parts total cell weight, preferably less than 10 parts mercury per million parts total cell weight) and modifications thereof. Such representative chemistries, for example, are disclosed in U.S. Pat. No. 5,401,590, herein incorporated by reference. The cell 710 of the invention also preferably does not contain added amounts of lead and thus can be essentially lead free, that is, the total lead content is less than 30 ppm, desirably less than 15 ppm of total metal content of the anode. Also, although the invention is principally directed to primary alkaline cells the anode and cathode chemistries can be adjusted so that the cells become secondary (rechargeable) cells as is known in the art.

The above cell (FIG. 1) can be an AAAA, AAA, AA, C or D cells prepared and used as test cells. C and D test cells were made as above described but with anode composition as given in the following examples. The C and D cells were used as test cells in the examples. The cathode composition and cell components in each case were the same as above described. The following specific cathode composition can be used in the following examples: $MnO_2$—86.5 wt %; graphite 6.3 wt. percent; aqueous KOH solution (38 wt. % KOH) 6.9 wt % and polyethylene binder 0.3 wt %. The anode composition, zinc concentration and particle size, gelling agent and electrolyte composition for the cells in the following examples can be as above described. The C and D cells tested had a bulk density of about 7.051 and 7.091 grams zinc per $cm^3$ anode, respectively. Zinc real density is 7.14 g/$cm^3$. The percent by volume of the aqueous electrolyte solution in the anode was about 29.4 and 29.6 percent by volume of the anode, respectively. The amount of zinc in the anode of the C cell was 12.04 grams and the amount of zinc in the anode of the D cell was 23.73 grams. Anode theoretical capacity for the C cell was 9.90 Amp-Hrs and theoretical capacity for the D cell was 19.51 Amp-hrs. The cells are balanced in conventional manner so that the mAmp-hr capacity of $MnO_2$ (based on 370 mAmp-hr per gram $MnO_2$) divided by the mAmp-hr capacity of zinc alloy (based on 822 mAmp-hr per gram zinc alloy) is about 1.

Example 1 shows the performance of a comparative C cell made as above described. This cell does not have a thermal insulation layer between the cell casing and label. Example 2 is the same C cell as Example 1 but with a thermal insulating layer inserted between the cell label and casing and covering the entire outside surface (in the longitudinal direction) as shown in FIG. 1. The insulation was composed of polyurethane foam with diisocyanate polyols having a uniform thickness of 7.67 mm so as to give the C cell the same overall diameter as a D cell, namely, an overall diameter of 32.31 mm. The material can be adhesive coated on its inside surface so that is can be applied and secured to the casing by wrapping it around the casing surface. Example 3 is a comparative D cell having essentially the same anode and cathode composition and cell components as the C cell in Example 1. Thus, the D cell in Example 3 does not contain a thermal insulation layer.

The cells in each of the examples were discharged under high power conditions and the performance compared. Fresh cells were discharged at a high rate continuous discharge at 1 Amp and 2 Amp continuous discharge to a cutoff voltage of 0.8 Volts. Fresh cells were intermittently discharged at constant resistance of 1.5 Ohm for a period of 4 minutes discharge followed by 11 minutes rest with such cycles performed continuously for 8 hours per day to a cutoff voltage of 0.8 volts. (This corresponds to a high intensity flashlight test.) Fresh cells were discharged at continuous discharge at constant current drain of 1 Amp per day to a cutoff voltage of 0.8 volt. (This simulates use in super boom box and portable color television sets.)

The performance of the cells for each test is reported in the following Tables 1 and 2.

TABLE 1

CELL PERFORMANCE - Continuous Discharge Data to 0.8 V cut-off

|  | 1A Cont. (Service hrs.) | 2A Cont. (Service hrs.) |
|---|---|---|
| Example 1 (C Cell - Uninsulated) | 2.786 | 0.758 |
| Example 2 (C Cell With Insulation) | 4.486 | 1.411 |
| Example 3 (D Cell - Uninsulated) | 3.637 | 2.047 |

As may be seen from Table 1 the C cell wrapped in thermal insulation (Example 2) gives better performance (service hours) in both of the tests than the same cell without thermal insulation (Example 1). Also, in comparing the performance of the insulation wrapped C cell of Example 2 with the D cell (without insulation) of Example 3 the following is evident: The performance at 1.0 A continuous discharge for the insulated C cell is actually better than a D cell without insulation. In addition, the performance (service hours) of an insulated C cell is improved by 61% and 86% in 1.0 and 2.0 Amp continuous discharges, respectively, due to the benefits of insulating a cell. This leads to the conclusion that thermally insulating an alkaline cell gives a benefit in performance during continuous discharge.

TABLE 2

CELL PERFORMANCE - Intermittent Discharge to 0.8 V cut-off

|  | 1.0 A 1 hr/day, (Ser. hrs.) | 1.5 ohm 4 min. (on)/11 min. (off) for 8 hr./day, (Ser. hrs.) |
|---|---|---|
| Example 1 (C cell without insulation) | 4.25 | 8.69 |
| Example 2 (C cell with insulation) | 4.24 | 8.69 |

TABLE 2-continued

CELL PERFORMANCE - Intermittent Discharge to 0.8 V cut-off

| | 1.0 A 1 hr/day, (Ser. hrs.) | 1.5 ohm 4 min. (on)/11 min. (off) for 8 hr./day, (Ser. hrs.) |
|---|---|---|
| Example 3 (D cell without insulation) | 6.08 | 19.5 |

Note:
Intermittent discharge at 1.0 Amp was for cell discharge at 1.0 Amp for 1 hour per day until 0.8 Volt cutoff was achieved. The intermittent discharge was at 1.5 ohm was for 4 minute cell discharge followed by 11 minutes rest (no discharge) for 8 hour per day cycles until a cutoff voltage of 0.8 volts was achieved.

As may be seen from Table 2, the C cell wrapped in thermal insulation (Example 2) gives a similar performance in both of the intermittent tests as the same cell without thermal insulation (Example 1). Also in comparing the performance of the insulation wrapped C cell of Example 2 with the D cell (without insulation) of Example 3 the following is evident: The performance of the insulated C cell is not equivalent to the D cell (without insulation) and the capacity yield of an alkaline battery is not improved for the intermittent discharge tests. The data leads to the conclusion that thermally insulating an alkaline cell gives a improvement in performance during continuous discharge, but not for the above intermittent test regimes.

The overall heat transfer coefficient, $U_o$, between the inside surface 750 of steel casing 720 and ambient external temperature can be determined for alkaline cells of different size with and without thermal insulation layer. The overall heat transfer coefficient is based on the inside surface 750 of the casing. For the purposes of calculation it can be assumed that the ambient external temperature is 25° C., the label 770 is polyvinylchloride (with adhesive and ink) of thickness 100 micron (0.01 cm). Label 770 has a thermal conductivity of about $4.14 \times 10^{-4}$ Cal/[sec cm ° K.]. The casing 720 is nickel plated steel of thickness about 0.254 mm (0.0254 cm) and has a thermal conductivity of 0.2 Cal/[sec cm ° K.]. For the purposes of calculation a preferred insulation 775 is of a material having a thermal conductivity of about 0.05 BTU/[hr ft ° F.] which is equivalent to $2.07 \times 10^{-4}$ Cal/[sec cm ° K.]

The above relationships apply to heat transfer through the wall of cylindrical tubes, is given in Eq. 1 wherein $U_o$ is the overall heat transfer coefficient based on the casing inside surface, Q, the heat transfer rate, (Cal/sec), $r_o$ is the radius to the casing inside surface, $T_o$ is the casing inside surface temperature, $T_a$ is the ambient temperature and L is length of the cell:

$$Q = U_o (2 \pi r_o L)(T_o - T_a) \quad \text{Eq. 1}$$

where, the overall heat transfer coefficient $U_o$ calculable as:

$$U_o = r_o^{-1} \left\{ 1/r_3 h_3 + \frac{\ln[r_1/r_0]}{k^{01}} + \frac{\ln[r_2/r_1]}{k^{12}} + \frac{\ln[r_3/r_2]}{k_{23}} \right\}^{-1} \quad \text{Eq. 2}$$

Reference is made to Example 2 wherein a C cell casing is provided with insulation to give this cell the outside diameter of a D cell. In such case the insulation thickness is 3.84 mm (0.384 cm). The steel casing has a thermal conductivity $k_{01} = 0.2$ Cal/[sec cm ° K.] at room temperature. Assume a $k_{12}$ of $2.07 \times 10^{-4}$ Cal/[sec cm ° K.] for the insulation. (This is equivalent to a thermal conductivity of 0.05 BTU/[hr ft ° F.] characteristic of many plastics.)

Figure 2:
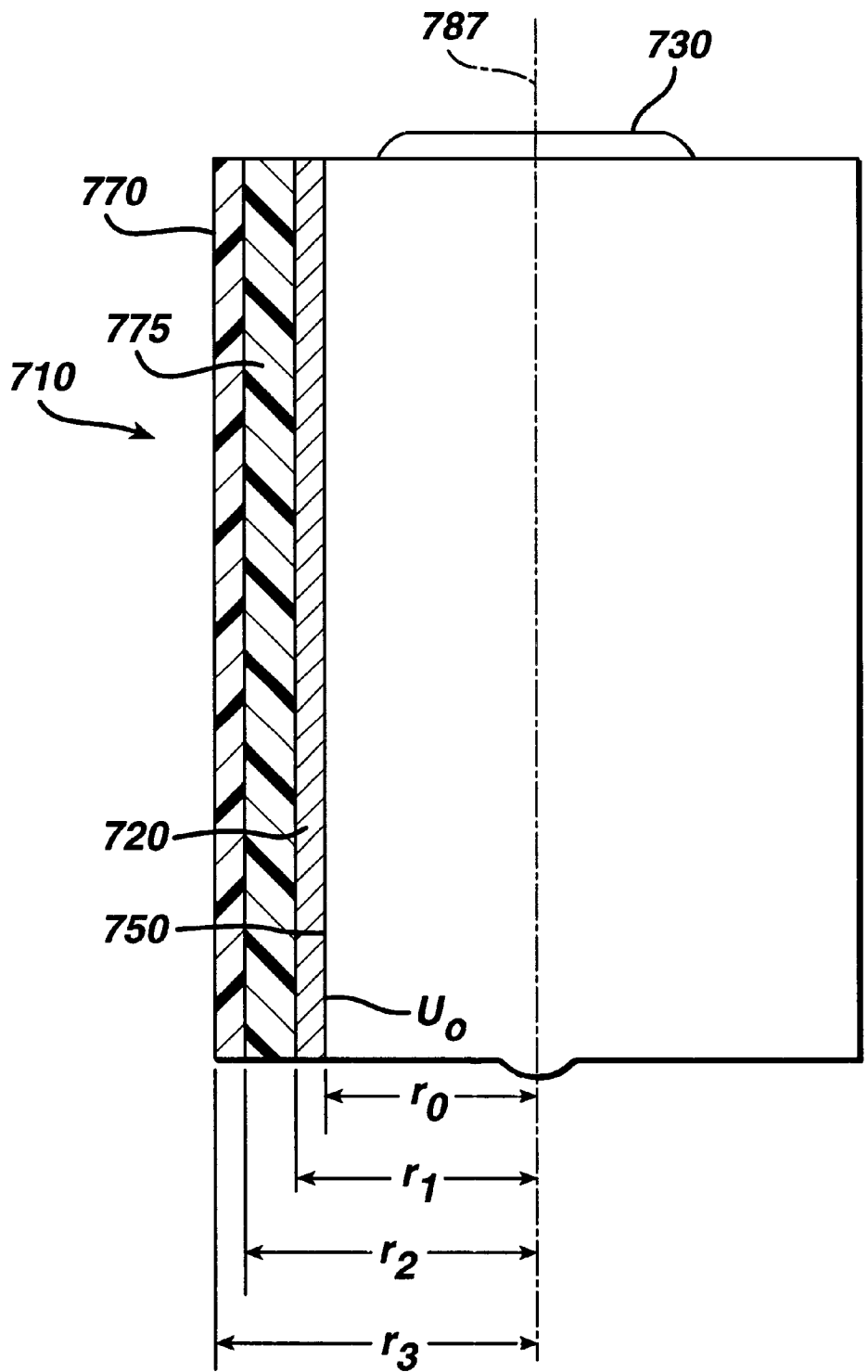
FIG. 2 is a cross-sectional schematic of the cell in FIG. 1 with radius of the various layers indicated.

The thermal conductivity $k_{23}$ of the polyvinylchloride label is about $4.14 \times 10^{-4}$ Cal/[sec cm ° K.]. The heat transfer coefficient $h_3$ of ambient air is about $4.14 \times 10^{-2}$ Cal/[sec cm$^2$ ° K.]. As shown in FIG. 2, $r_o$ is the radius to the inside surface of the casing. (For a C cell $r_o = 1.25$ cm) As also shown in FIG. 2, $r_1$ is the radius to the outside surface of the casing; $r_2$ is the radius to the outside surface of the insulation; $r_3$ is the radius to the outside surface of the label. The ratio of $r_1/r_o$ for the C cell is 1.275 cm/1.25 cm=1.02. The ratio of $r_2/r_1$ is 1.66 cm/1.275 cm=1.30. The insulation thickness is 0.384 cm. Assume a label thickness of 100 micron (0.01 cm). The ratio of $r_3/r_2$ is 1.67 cm /1.66 cm=1.01.

Inserting the above values into Eq. 2 the overall heat transfer coefficient $U_o$ is calculated as:

$$U_o = 1/1.25$$

$$\left\{ 1/[1.67 \times 4.14 \times 10^{-2}] + \frac{\ln 1.02}{0.2} + \frac{\ln 1.30}{2.07 \times 10^{-4}} + \frac{\ln 1.01}{4.14 \times 10^{-4}} \right\}^{-1}$$

$U_o = 0.80\{14.4 + 0.0198/0.2 + 0.262/2.07 \times 10^{-4} + 0.00995/4.14 \times 10^{-4}\}^{-1}$ $U_o = 0.80\{14.4 + 0.099 + 1265.7 + 24.0\}^{-1}$ $U_o = 0.80/1304.2 = 0.0006$ Cal/[cm$^2$ sec ° K.]

The overall heat transfer equation is the same as Equation 1, wherein Q is the heat transfer rate, (Cal/sec); $T_o$ is the casing inside surface temperature; $T_a$ is the ambient temperature and L is length of the cell:

$$Q = U_o (2 \pi r_o L)(T_o - T_a)$$

For comparison the overall heat transfer coefficient, $U_o$, can be calculated for the same C cell (see Example 1) without thermal insulation. In such case $r_2 = r_1$; $r_o = 1.25$ cm; $r_1/r_o = 1.275/1.25 = 1.02$; $r_3/r_2 = 1.285/1.275 = 1.01$, wherein $r_o$ is the radius to the inside surface of the casing; $r_1 = r_2$ is the radius to the outside surface of the casing; and $r_3$ is the radius to the outside surface of the label. The casing thermal conductivity is $k_{01}$, the label thermal conductivity is $k_{23}$ and the heat transfer coefficient of ambient air at room temperature is $h_3$.

$$U_o = r_o^{-1} \left\{ 1/r_3 h_3 + \frac{\ln[r_1/r_0]}{k^{01}} + \frac{\ln[r_3/r_2]}{k_{23}} \right\}^{-1}$$

$$U_o = 1/1.25 \left\{ 1/[1.27 \times 4.14 \times 10^{-2}] + \frac{\ln 1.02}{0.2} + \frac{\ln 1.01}{4.14 \times 10^{-4}} \right\}$$

$U_o = 0.80\{19.01 + 0.0198/0.2 + 0.00995/4.14 \times 10^{-4}\}^{-1}$ $U_o = 0.80\{19.01 + 0.099 + 24.0\}^{-1} = 0.80/43.11 = 0.019$ Cal/[cm$^2$ sec ° K.]

$U_o = 0.019$ Cal/[cm$^2$ sec ° K.]

Thus, the heat transfer coefficient for the C cell in Example 2 had an overall heat transfer coefficient $U_o$ which was 0.000613/0.019=0.032 or about 3 percent that of the same C cell which was not wrapped in thermal insulation. Conversely, the reduction in overall heat transfer coefficient $U_o$ resulting from wrapping the C cell with insulation was about 97%. This causes the temperature of the casing inside surface and the cell internal temperature to rise significantly thereby resulting in much better cell performance.

If the above calculation is made with an insulation thickness of 2 mm (0.2cm) the overall heat transfer coefficient $U_o$, is calculated as 0.00107 Cal/[cm² sec ° K.]. This is 0.00107/0.019 or 5.6% of the heat transfer coefficient of the same cell without thermal insulation and corresponds to a 94.4% reduction in the overall heat transfer coefficient. If the above calculation is made with an insulation thickness of 1 mm (0.1 cm) the overall heat transfer coefficient $U_o$, is calculated as 0.0020 Cal/[cm sec ° K.]. This is 0.0020/0.019 or 10.5% of the heat transfer coefficient of the same cell without thermal insulation and corresponds to a 89.5% reduction in the overall heat transfer coefficient.

If the above calculation is made with an insulation thickness of 0.50 mm (500 micron or 0.05 cm) the overall heat transfer coefficient $U_o$, is calculated as 0.00360 Cal/[cm sec ° K.]. This is 0.00360/0.019 or 18.95% of the heat transfer coefficient of the same cell without thermal insulation and corresponds to a 81.05% reduction in the overall heat transfer coefficient. If the above calculation is made with an insulation thickness of 0.25 mm (250 micron or 0.025 cm) the overall heat transfer coefficient U.,is calculated as 0.0061 Cal/[cm² sec ° K.]. This is 0.0061/0.019 or 32.1% of the heat transfer coefficient of the same cell without thermal insulation and corresponds to a 67.9% reduction in the overall heat transfer coefficient. Accordingly, it has been determined that the overall heat transfer coefficient $U_o$ can be easily reduced by at least 65%, typically at least 75%, more typically by at least 90% by providing the cell casing with insulation when the insulation is between about 0.25 to 4 mm, desirably between about 0.5 to 4 mm to 4 mm. Preferably the insulation is between about 1 to 4 mm, preferably between about 2 to 4 mm thick. If the above calculation is made with an insulation thickness of 0.1 mm (100 micron or 0.01 cm) the overall heat transfer coefficient $U_o$, is calculated as 0.0107 Cal/[cm² sec ° K.]. This is 0.0107/0.019 or 56.3% of the heat transfer coefficient of the same cell without thermal insulation and thus represents a reduction of 43.7% in the overall heat transfer coefficient. If the above calculation is made with an insulation thickness of 0.02 mm (20 micron or 0.002 cm) the overall heat transfer coefficient $U_o$, is calculated as 0.0177 Cal/[cm² sec ° K.]. This is 0.0177/0.019 or 93.2% of the heat transfer coefficient of the same cell without thermal insulation and thus represents a reduction of 6.8% in the overall heat transfer coefficient.

The C Cell of Example 1 was wrapped with insulation at various thicknesses. The insulation used was Scotch Brand ½ inch wide polyurethane double sided tape from the 3M Company. The insulation was continuously wrapped around the cell casing to insulation thicknesses (measured radially) at 1 mm, 2.5 mm and 4 mm. (At 4 mm insulation thickness the C Cell had about an overall diameter of a D cell.) The insulated cells can have a conventional polyvinylchoride label of about 100 micron thickness covering the insulation. All control (uninsulated) cells used for comparison in the examples had a conventional 100 micron polyvinylchloride label wrapped around the cell casing. The insulated cells were discharged at continuous discharge at 1.0 Amp to 0.9 Volt and 0.8 volt cutoff.

The cell capacity (Amp-hr) was recorded and compared with that of an uninsulated C Cell that was similarly discharged. (The uninsultated C cell had only a conventional PVC label of about 100 micron thickness wrapped around the cell casing.) The same experiment was performed with fresh C cells wrapped with the same insulation thicknesses but the cells were discharged continuously at 0.5 Amp continuous discharge. The cell capacity (Amp-hr) was recorded and compared with that of an uninsulated C Cell that was similarly discharged.

Performance test results for cell capacity (Amp-Hrs) for AA cells with various insulation thickness compared with the capacity of an uninsulated AA cell are reported in Table 3A. Performance test results for cell energy output (Watt-Hrs) for AA cells with various insulation thickness compared with the energy output of an uninsulated AA cell are reported in Table 3A. (The insulation thickness is the radial thickness ($r_2-r_1$) as shown in FIG. 2. All cells tested had a conventional polyvinylchloride label of about 100 micron thickness covering the cell casing. The label is not considered a part of the insulation.

TABLE 3A

| Insulation Thickness, mm | Cell Capacity Yield (Amp-hr) | |
|---|---|---|
| | 0.9 Volt (Cut-Off) | 0.8 Volt (Cut-Off) |
| Continuous Discharge At 0.5 Amp for Insulated C Cells | | |
| 0 (Control) | 3.993 | 4.800 |
| 1.0 | 4.405 | 4.927 |
| 2.5 | 4.657 | 5.167 |
| 4.0 | 4.672 | 5.127 |
| Continuous Discharge At 1.0 Amp for Insulated C Cells | | |
| 0 (Control) | 1.854 | 2.629 |
| 1.0 | 2.011 | 2.797 |
| 2.5 | 2.284 | 3.008 |
| 4.0 | 2.318 | 3.015 |

| Insulation Thickness, mm | 0.9 Volt (Cut-Off) | 0.8 Volt (Cut-Off) |
|---|---|---|
| Continuous Discharge at 0.5 Amp for Insulated C Cells, Percent Amp-Hr. Increase Over Control | | |
| 1.0 | 10.3 | 2.6 |
| 2.5 | 16.6 | 7.6 |
| 4.8 | 17.0 | 6.8 |
| Continuous Discharge at 1.0 Amp for Insulated C Cells, Percent Amp-Hr. Increase Over Control | | |
| 1.0 | 8.5 | 6.4 |
| 2.5 | 23.2 | 14.4 |
| 4.0 | 25.0 | 14.7 |

TABLE 3B

| Insulation Thickness, mm | Cell Energy (Watt-Hrs) | |
|---|---|---|
| | 0.9 Volt (Cut-Off) | 0.8 Volt (Cut-Off) |
| Continuous Discharge At 0.5 Amp for Insulated C Cells | | |
| 0 (Control) | 4.296 | 4.985 |
| 1.0 | 4.879 | 5.326 |
| 2.5 | 5.153 | 5.591 |
| 4.0 | 5.227 | 5.616 |
| Continuous Discharge At 1.0 Amp for Insulated C Cells | | |
| 0 (Control) | 1.980 | 2.641 |
| 1.0 | 2.144 | 2.815 |
| 2.5 | 2.434 | 3.051 |
| 4.0 | 2.487 | 3.081 |

| Insulation Thickness, mm | 0.9 Volt (Cut-Off) | 0.8 Volt (Cut-Off) |
|---|---|---|
| Continuous Discharge at 0.5 Amp for Insulated C Cells, Percent Watt-Hr Increase Over Control | | |
| 1.0 | 13.6 | 6.8 |
| 2.5 | 19.9 | 12.2 |
| 4.0 | 21.7 | 12.7 |

TABLE 3B-continued

Continuous Discharge at 1.0 Amp for Insulated C Cells, Percent Watt-Hr. Increase Over Control

| | | |
|---|---|---|
| 1.0 | 8.3 | 6.6 |
| 2.5 | 22.9 | 15.5 |
| 4.0 | 25.6 | 16.7 |

A comparison of the capacity yield data shows that AA alkaline cells provided with wound polyurethane tape (Scotch Brand double sided polyurethane tape) insulation resulting in insulation thicknesses ($r_2-r_1$) between about 1.0 and 4 mm results in a noticeable capacity improvement between about 2.6 and 6.8 percent for cells discharged at 0.5 Amp drain to a cut-off voltage of 0.8 Volt. The percent improvement in energy output for the same insulated cells discharged to 0.8 Volt was between about 6.8 and 12.7 percent.

The data shows that AA alkaline cells provided with wound polyurethane tape (Scotch Brand double sided polyurethane tape) insulation of small thicknesses between about 1.0 and 4 mm results in a noticeable capacity improvement between about 6.4 and 14.7 percent for cells discharged at 1.0 Amp drain to a cut-off voltage of 0.8 Volt. The percent improvement in energy output for the same insulated cells discharged to 0.8 Volt was between about 6.6 and 16.7 percent.

Fresh AA alkaline cells (Duracell Ultra) were then inserted into a 1.5 inch thick (3.81 cm) styrofoam block so that the cell bodies fitted tightly within the block, with the cell ends exposed to the environment. These cells were discharged at continuous constant current drain at levels between 0.1 and 2.0 Amp. Fresh AA alkaline cells (Duracell Ultra) were then discharged without any added insulation. (All the AA cells come with a printed plastic label of about 100 micron thickness wrapped around the casing.) The insulated and uninsulated AA alkaline cells (Duracell Ultra) were discharged continuously at constant current drain levels between 0.1 Amp to 2.0 Amp. The capacity yield (Amp-Hr) in each case was recorded when the cell reached a voltage cut-off level of 0.9 Volt and 0.8 Volt. The discharge capacity yield for each of the insulated and uninsulated cells as well as the percent increase due to the added insulation are reported in Table 4.

TABLE 4

| Current (Amp) Uninsulated | Cell Capacity Yield (Amp-hr) | |
|---|---|---|
| AA Alkaline | 0.9 Volt (Cut-Off) | 0.8 Volt (Cut-Off) |
| 2.0 | 0.336 | 0.626 |
| 1.6 | 0.521 | 0.792 |
| 1.2 | 0.707 | 0.886 |
| 1.0 | 0.808 | 1.014 |
| 0.9 | 0.864 | 1.076 |
| 0.8 | 0.987 | 1.136 |
| 0.7 | 1.095 | 1.239 |
| 0.6 | 1.214 | 1.357 |
| 0.5 | 1.343 | 1.448 |
| 0.3 | 1.700 | 1.767 |
| 0.2 | 2.050 | 2.103 |
| 0.1 | 2.348 | 2.415 |

TABLE 4-continued

| Current (Amp) AA Alkaline Insulated With 1.5 Inch | Cell Capacity Yield (Amp-hr) | |
|---|---|---|
| Thick Styrofoam | 0.9 Volt (Cut-Off) | 0.8 Volt (Cut-Off) |
| 2.0 | 0.772 | 1.134 |
| 1.6 | 1.064 | 1.295 |
| 1.2 | 1.210 | 1.415 |
| 1.0 | 1.319 | 1.524 |
| 0.9 | 1.362 | 1.553 |
| 0.8 | 1.453 | 1.613 |
| 0.7 | 1.485 | 1.653 |
| 0.6 | 1.574 | 1.733 |
| 0.5 | 1.622 | 1.795 |
| 0.3 | 1.890 | 1.980 |
| 0.2 | 2.120 | 2.179 |
| 0.1 | 2.411 | 2.523 |

| Current (Amp) | Percent Capacity 0.9 Volt (Cut-Off) | Increase Over Control 0.8 Volt (Cut-Off) |
|---|---|---|
| 2.0 | 129.76 | 81.15 |
| 1.6 | 104.38 | 63.51 |
| 1.2 | 71.15 | 59.71 |
| 1.0 | 63.24 | 50.30 |
| 0.9 | 57.64 | 44.33 |
| 0.8 | 47.21 | 41.99 |
| 0.7 | 35.62 | 33.41 |
| 0.6 | 29.65 | 27.71 |
| 0.5 | 20.77 | 23.96 |
| 0.3 | 11.18 | 12.05 |
| 0.2 | 3.42 | 3.61 |
| 0.1 | 2.68 | 4.47 |

A comparison of the capacity (Amp-hr) yield data reveals that the insulated AA alkaline cells show a considerable percent improvement in capacity, between 50% and 80% increase at high current drains between 1.0 and 2.0 Amp for cells discharged to 0.8 Volt. The data reveals that insulated AA alkaline cells exhibit a significant percent improvement in capacity, between about 12% and 50% improvement at current drains between 0.3 Amp and 1.0 Amp for cells discharged to 0.8 Volt.

Although the specific embodiment shows the insulation layer applied in uniform thickness, it should be appreciated that variations are possible, for example, the insulation can have a varying, nonuniform thickness along its length or have cutout portions, holes, gaps or other discontinuities in its surface which can be filled with other material or left empty. Although the present invention was described with respect to specific embodiments, it should be recognized that variations are possible without departing from the concept of the invention. Thus, the invention is not intended to be limited to the specific embodiments, but rather its scope is reflected by the claims and equivalents thereof.

What is claimed is:

1. A primary alkaline electrochemical cell selected from the group consisting of an AAAA, AAA, AA, C and D size cylindrical alkaline cell, said cell comprising a housing having a curved outside surface facing the external environment and an inside surface facing the cell interior, a positive and a negative terminal, an anode comprising zinc, a cathode comprising manganese dioxide, and an aqueous alkaline electrolyte solution, said cell further comprising a thermal insulating material around essentially all of the curved outside surface of said housing, wherein the cell further comprises a label around the housing, said label having a thickness between about 75 micron (3 mil) and 250 micron (10 mil), wherein said thermal insulating material is between said label and said housing, said thermal insulating material having a thickness between about 500 micron (20 mil) and 15 mm (600 mil).

2. The cell of claim 1 wherein the thermal insulating material adheres to the outside surface of said housing.

3. The cell of claim 1 wherein the thermal insulating material has openings therethrough.

4. The cell of claim 1 wherein the thermal insulating material has a thickness of between about 1000 micron (1 mm) and 15 mm.

5. The cell of claim 1 wherein the thermal insulating material has a thickness of between about 2000 micron (2 mm) and 15 mm.

6. The cell of claim 1 wherein the thermal insulating material has a thickness of between about 3000 micron (3 mm) and 15 mm.

7. The cell of claim 1 wherein said thermal insulating material has a thermal conductivity between about 0.01 and 10 BTU/[hr ft ° F.] ($4.14 \times 10^{-5}$ and $4.14 \times 10^{-2}$ cal/[sec cm ° K.]).

8. The cell of claim 1 wherein the insulating material comprises polyurethane.

9. The cell of claim 1 wherein the aqueous alkaline electrolyte solution comprises potassium hydroxide.

10. The cell of claim 1 wherein said cell comprises less than 20 parts mercury per million parts of total cell weight.

11. The cell of claim 1 wherein said cell comprises less than 30 parts lead per million parts of total metal content in the anode.

12. The cell of claim 1 wherein the anode comprises a portion of said aqueous alkaline solution in the cell and the percent by volume of the aqueous electrolyte solution in the anode is between about 58 and 80 percent by volume of the anode.

13. The combination of a primary alkaline electrochemical cell, a thermal insulating material, and a battery compartment housing containing the cell, said cell-selected from the group consisting of an AAAA, AAA, AA, C and D size cylindrical alkaline cell, said cell comprising a casing, a positive and a negative terminal, an anode comprising zinc, an aqueous alkaline electrolyte solution, a separator and a cathode comprising manganese dioxide, wherein said battery compartment housing comprises an inside and an outside surface, wherein said cell casing comprises a curved outside surface facing the battery compartment housing and said cell casing comprises an inside surface facing the cell interior, said thermal insulating material being between said cell and at least one of said inside and outside surfaces of said battery compartment, wherein said insulating material circumvents essentially all of the curved outside surface of said cell casing and wherein said insulating material has a thickness of between about 1 mm and 12 mm.

14. The cell of claim 13 wherein the cell further comprises a label around said cell casing.

15. The cell of claim 14 wherein the label has a thickness of less than 250 micron (10 mil or $250 \times 10^{-6}$ meter).

16. The combination of claim 13 wherein the insulating material is in contact with at least a major portion of the inside surface of said battery compartment housing.

17. The combination of claim 13 wherein the insulating material is in contact with at least a major portion of the outside surface of said battery compartment housing.

18. A primary alkaline electrochemical cell selected from the group consisting of an AAAA, AAA, AA, C and D size cylindrical alkaline cell, said cell comprising a cylindrical housing, a positive and a negative terminal, an anode comprising zinc, a cathode comprising manganese dioxide, and an aqueous alkaline electrolyte solution, a separator and a cathode comprising manganese dioxide, said housing having a curved outside surface facing the external environment and an inside surface facing the cell interior, said cell further comprising a thermal insulating material around essentially all of the curved outside surface of said housing, said thermally insulating material being in the form of a sleeve manually insertable around the cell casing, said sleeve being manually removable and having a thickness between about 1 mm and 12 mm.

* * * * *